Nov. 14, 1961

S. B. VALIULIS 3,008,852

TAPE RECORDER HEAD CLEANING TAPE

Filed May 22, 1959

INVENTOR
STANLEY B. VALIULIS

BY Andrew F. Wintercorn

ATTORNEY 3,008,852

TAPE RECORDER HEAD CLEANING TAPE

Stanley B. Valiulis, Rockford, Ill., assignor to Textron Inc., Providence, R.I., a corporation of Rhode Island Filed May 22, 1959, Ser. No. 815,160

2 Claims. (Cl. 134—6)

This invention relates to a cleaning strip or tape adapted to be run through the head on a tape recorder in the same way as a standard recording tape, but back and forth one or more times, for the speedier and more thorough cleaning of the otherwise hard to get at recording and erasing parts inside the head without the necessity for removal of the head cover or taking anything apart.

The tape, made of a suitable tough but flexible cotton fabric impregnated with a suitable cleaner, is provided in a 100 foot length on a reel, similarly as a recording tape, and of a corresponding width and thickness and is threaded through the head in the same way as and in lieu of the recording tape and run all the way through to the end and then rewound, thereby cleaning and polishing the recording and erasing parts inside the head for most efficient operation.

The invention is illustrated in the accompanying drawing, wherein—

FIG. 1 is a plan view of a tape recorder showing a reel of cleaning strip or tape applied to the left hand spindle in lieu of a reel of standard recording tape, the cleaning tape being shown as threaded through the head in the same way as a recording tape and extending over to and winding onto the takeup reel for the passing of the full length of the cleaning tape through the head in one direction and then back again by rewinding the same one or more times for a gentle but prolonged and therefore thorough cleaning and polishing operation;

The same reference numerals are applied to corresponding parts in these three views.

Figure 1:
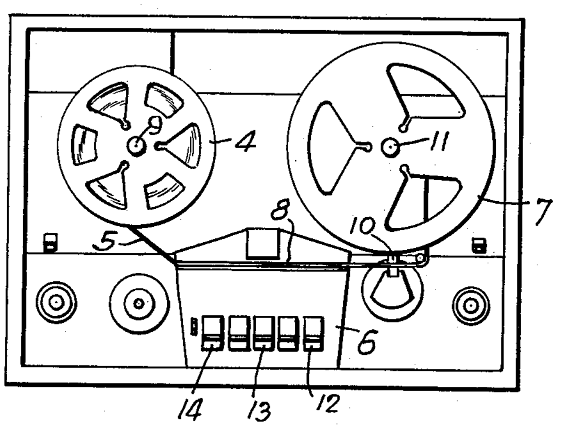
Figures 2, 3:
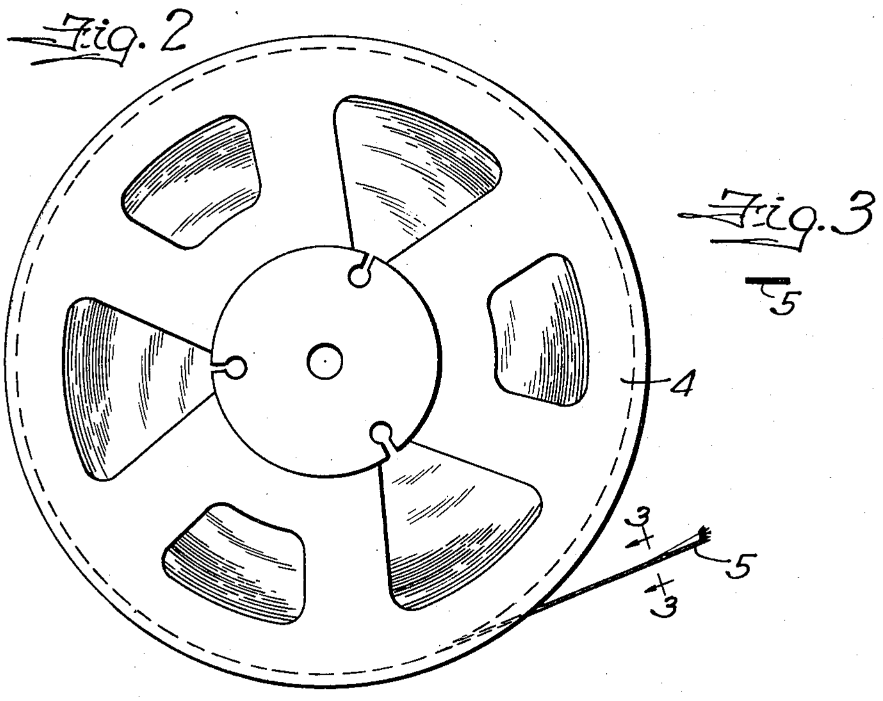
FIG. 2 is a face view (full size) of the reel of cleaning tape.
FIG. 3 is a sectional detail of the tape on line 3—3 of FIG. 2.

Referring to the drawing, the reference numeral 4 designates the reel of flexible cleaning strip or tape 5, which, as indicated in the sectional detail, FIG. 3, is made of a suitable soft absorbent fabric, such as cotton, the tape being approximately the same width and thickness as a standard recording tape, and of a suitable length, such as 100 feet, so that it takes only about a minute to run it through the head 6 the full length one way onto the takeup reel 7 and only about another minute to rewind it back onto reel 4, this operation being repeated one or more times if the operator so desires, or considers the conditions required. The tape 5, being impregnated with a petroleum solvent and a cleaning compound, clears out whatever coating of finely powdered iron oxide has been deposited in the head off the recording tape, this metallic powder if allowed to build up to a thick enough coating interfering alike with good recording and good reproduction. The tape also cleans and polishes the recording and erasing parts inside the head, removing any rust and dirt present, so that the head is placed in good condition for best possible performance. Usually the running of the cleaning tape through the head back and forth once is enough to do a thorough job in a couple of minutes, but occasionally a recording head may be so extremely dirty that the tape should be run through twice or even more times, and a few drops of a cleaning solution recommended by the manufacturer of the recorder can be applied to the head in the slot 8 before the cleaning tape is used. In any event, there is never any need for removing the head cover or taking anything apart, and it requires no special skill on the part of the user to perform the cleaning operation satisfactorily with this cleaning tape, and expensive repair bills are thereby avoided and a lot of time and effort are saved. Furthermore, the cost of the cleaning tape 5 and reel 4 is low, considering that it may be used over and over again many times. Since recording tapes are standardized and the cleaning tape is of a corresponding width and thickness, it follows that the cleaning tape fits all makes and models of tape recorders.

In operation, the reel of recording tape, which is generally of plastic material with fine particles of iron oxide embedded therein for recording purposes, is removed from drive spindle 9 and reel 4 of cleaning strip or tape 5 substituted. It is due to the fact that some of these fine particles of iron oxide are deposited on the active faces of the erasing head and recording head along with a certain amount of dust and dirt in the use of the tape recorder that periodic cleaning is necessary if the tape recorder is to operate efficiently both in the matter of recording and in the matter of reproducing, and, of course, both of those operations depend upon good erasing action, which cannot be obtained if the erasing head isn't clean and capable of performing its function properly. The cleaning tape 5 is threaded through slot 8 past the automatic stop lever 10 and connected to takeup reel 7 on the other drive spindle 11. Then, assuming the control button at the left lower corner has been turned on, the "forward" button 12 is depressed so that nearly the full 100 foot length of cleaning tape 5 is run through the head from reel 4 onto reel 7, which takes about one minute, after which the "stop" button 13 is depressed to stop the tape, and then the "rewind" button 14 is depressed to rewind the tape 5 onto reel 4. Stop button 13 is depressed at the end of the operation, or the automatic stop lever 10 stops the operation when the end of the tape passes that point. Usually, this one pass back and forth is enough to thoroughly clean and polish the internal parts of the head. The fact that the reel 4 is of appreciably smaller radius than the take-up reel 7 that is provided on the machine is important from the standpoint that it eliminates likelihood of a user running the cleaning tape 5 through the head 6 only in one direction, as he might otherwise be inclined to do, especially if he happend to be in a hurry. The smaller reel 4 for the cleaning tape will therefore never be left on the machine and used as a take-up reel; the cleaning tape 5 is always rewound onto this reel. If one additional pass, or more, seems advisable, it takes very little additional time. The recording and reproducing head, which is near the right hand end of the slot 8, will have the closest and steadiest contact with the cleaning tape 5 while the reel 7 is winding this tape onto it, because of the pull on the tape being then toward reel 7, but during rewind, when the cleaning tape 5 is being wound onto the reel 4 the pull on the tape 5 is, of course, toward the reel 4, and consequently, the erasing head, which is near the left hand end of the slot 8, has the closest and steadiest contact with the cleaning tape. In other words, while reel 7 is winding, reel 4 turns idly in the unwinding of the cleaning tape therefrom, and while reel 4 is winding, reel 7 turns idly in the unwinding of the cleaning tape therefrom. Even with the closest and steadiest contact of the tape on the active faces of the two heads in head 6 the cleaning action is so gentle that there is no danger of any damage being done to these sensitive parts, and it is only because the cleaning operation is prolonged enough that a thorough cleaning job is assured, and inasmuch as the power of the machinne is used there is no likelihood of the operator, through fatigue or a feeling of monotony, failing to do a thorough job whenever he undertakes it. Hence, a tape recorder can be kept recording and reproducing at much closer to its highest efficiency when the cleaning is done in accordance with the present invention, whereas if the user were left to his own resources, the chances are the machine would not be cleaned nearly as often nor as thoroughly as it should be for best operation.

It is believed the foregoing description conveys a good understanding of the objects and advantages of my invention. The appended claims have been drawn to cover all legitimate modifications and adaptations.

I claim:

1. The method of cleaning the tape coacting faces on the internal electronic parts of the head of a tape recording machine having the usual power operable drive spindles for a reel of recording tape and a takeup reel, the method consisting in removing from its spindle the reel of recording tape, applying to said spindle a similar reel having wound thereon only an appreciable length of flexible cleaning tape that is of approximately the same width as the recording tape and adapted for cleaning the tape coacting faces on the internal electronic parts of the head of the tape recording machine, threading the cleaning tape through the head and connecting it to the takeup reel, and running the machine to run the tape forward through the head onto the takeup reel and back through the head onto the tape reel again in substantially the same mechanical relationship to the active faces of the recording and erasing heads as a recording tape in the operation of the tape recording machine, the operation being performed one or more times until the faces on the aforenamed internal parts in the head are cleaned and polished.

2. A cleaner for the head of a tape recorder having a slot through which a recording tape is normally threaded for endwise movement onto a take-up reel, said cleaner comprising a reel of cleaning tape of soft flexible fabric of approximately the same width as the recording tape wound by itself on said reel, which is constructed to replace the usual reel of recording tape, said cleaning tape being adapted to be run back and forth through the slot onto and off the take-up reel in the absence of the recording tape in substantially the same mechanical relationship to the head as a recording tape in the operation of the tape recorder, whereby to clean and polish internal parts of the head otherwise cooperating closely only with the recording tape, the reel carrying the cleaning tape being of appreciably smaller capacity than the take-up reel to insure return of the cleaning tape by the operator onto the cleaning tape reel by operation of the tape recorder in the proper direction after a cleaning operation.

References Cited in the file of this patent

UNITED STATES PATENTS

| | | |
|---|---|---|
| 2,606,409 | Gordon | Aug. 12, 1952 |
| 2,728,103 | Benedict et al. | Dec. 27, 1955 |
| 2,934,394 | Emslie et al. | Apr. 26, 1960 |